US007966012B2

(12) United States Patent  
Parker (10) Patent No.: US 7,966,012 B2
(45) Date of Patent: Jun. 21, 2011

(54) WIRELESS PROTOCOL CONVERTER

(75) Inventor: Jeffrey L. Parker, Jacksonville, FL (US)

(73) Assignee: ParkerVision, Inc., Jacksonville, FL (US)

( * ) Notice: Subject to any disclaimer, the term of this patent is extended or adjusted under 35 U.S.C. 154(b) by 10 days.

(21) Appl. No.: 10/936,821

(22) Filed: Sep. 9, 2004

(65) Prior Publication Data

US 2006/0052099 A1 Mar. 9, 2006

(51) Int. Cl.
*H04W 4/00* (2009.01)
(52) U.S. Cl. .................................................. 455/426.1
(58) Field of Classification Search .............. 455/426.1, 455/432, 403, 466, 406, 410, 414.4, 572, 455/574; 370/466, 352, 353, 354, 462–463, 370/452–453; 709/219, 200
See application file for complete search history.

(56) References Cited

U.S. PATENT DOCUMENTS

| | | | | |
|---|---|---|---|---|
| 6,782,003 B1* | 8/2004 | Giroux et al. | ................. | 370/466 |
| 2002/0147008 A1* | 10/2002 | Kallio | ............................ | 455/426 |
| 2002/0164983 A1* | 11/2002 | Raviv et al. | .................... | 455/432 |
| 2003/0134636 A1* | 7/2003 | Sundar et al. | ................. | 455/432 |
| 2003/0156566 A1* | 8/2003 | Griswold et al. | ............. | 370/338 |
| 2005/0083846 A1* | 4/2005 | Bahl | ............................. | 370/236 |
| 2005/0096024 A1* | 5/2005 | Bicker et al. | .................. | 455/417 |
| 2005/0141456 A1* | 6/2005 | Shaheen | ........................ | 370/331 |
| 2005/0238047 A1* | 10/2005 | Holland et al. | ............... | 370/465 |
| 2006/0022816 A1* | 2/2006 | Yukawa | ......................... | 340/521 |
| 2006/0056370 A1* | 3/2006 | Hancock et al. | .............. | 370/338 |
| 2006/0084417 A1* | 4/2006 | Melpignano et al. | ......... | 455/418 |
| 2006/0116129 A1* | 6/2006 | Gorsuch | .................... | 455/452.2 |
| 2007/0225034 A1* | 9/2007 | Schmidt | .................... | 455/552.1 |
| 2008/0119196 A1* | 5/2008 | Hamano et al. | ............... | 455/445 |

* cited by examiner

*Primary Examiner* — Melody Mehrpour
(74) *Attorney, Agent, or Firm* — Sterne Kessler Goldstein & Fox, P.L.L.C.

(57) ABSTRACT

Methods and systems for interfacing between broadband wireless communication systems and Local Area Network (LAN) systems includes a repeater station placed at a location that receives sufficient signal strength from a broadband wireless service provider. LAN devices interface with the broadband wireless service provider through the repeater station. The LAN devices are able to operate within the operating range of the repeater station. The repeater station includes a protocol converter that interfaces between a first protocol associated with the broadband wireless service provider, and one or more protocols associated with the devices. For example, and without limitation, the protocol converter converts between a first protocol associated with a Wide Area Network (WAN) service provider, such as a cellular telephone protocol, and one or more LAN protocols associated with the one or more devices. The one or more devices optionally include one or more wireless devices.

25 Claims, 4 Drawing Sheets

FIG. 4

WIRELESS PROTOCOL CONVERTER

BACKGROUND OF THE INVENTION

1. Field of the Invention

The present invention relates generally to wireless data communication and, more particularly, to broadband wireless data communication.

2. Related Art

There is an increasing demand for broadband wireless communications, such as wireless internet access, which service providers are attempting to provide.

Cellular telephone companies are advertising future availability of broadband wireless internet access. According to the advertising, users will be able to connect to the internet at ever increasing speeds using cellular telephone systems.

Conventional cellular telephone systems do not provide uniform indoor or outdoor coverage. For example, a cellular telephone may work well in one part of a building but not in another part of the building or in one part of a city, but not the other.

Thus, it is expected that broadband wireless technology, such as cellular broadband wireless technology, will suffer from at least the same and most likely more of the location limitations as conventional cellular telephone technology. In fact, for a number of reasons, it is expected that cellular broadband wireless technology will suffer even greater location limitations due to factors such as increased bandwidth and additional users.

For example, broadband wireless communication will require transmissions at higher bandwidths to extend the available data rates. The higher the bandwidth, the more signal to noise ratio will be required to accurately transmit and receive the information. Given that all other factors remain the same, the distance and reliability will be reduced as the bandwidth increases. In addition, other cell phone frequency bands are being considered, at even higher frequencies. Cell phone systems deploying higher frequency technology will have increased distance and reliability problems due to increased directionally and free space loss.

In many locations, the current coverage area is unacceptable for low speed voice applications. Higher bandwidth and higher frequency wireless signals will reduce the current coverage area even more. As a result, in some environments and locations, reception of broadband wireless communications is expected to be poor or non-existent. In other words, broadband wireless communications, such as planned internet access through cellular telephone systems, will not provide adequate coverage in many locations and situations.

What is needed, therefore, is a method and system for extending the coverage area for broadband wireless communications, such as, but not limited to, planned internet access through cellular telephone systems.

SUMMARY OF THE INVENTION

The present invention is directed to methods and systems for extending the coverage area for broadband wireless communications such as planned internet access through cellular telephone systems. The invention is not, however, limited to planned internet access through cellular telephone systems.

A wireless repeater station is provided to interface between a broadband wireless service provider and one or more wireless devices. The wireless repeater station is placed at a location that receives sufficient signal strength from the broadband wireless service provider to enable the one or more wireless devices operate within the operating range of the repeater station.

The repeater station includes a protocol converter that interfaces between a first protocol associated with the broadband wireless service provider, and one or more protocols associated with the devices. For example, and without limitation, the protocol converter converts between a first protocol associated with a wireless internet service provider, such as a cellular telephone protocol, and one or more Local Area Network ("LAN") protocols associated with the one or more devices. The one or more devices optionally include one or more wireless devices.

The devices are able to operate within a range of the repeater station. The present invention thus extends the coverage area of the broadband wireless service to the range of the repeater station.

These and other features of the present invention will become readily apparent upon further review of the following specification and drawings or may be learned by practice of the invention. It is to be understood that both the foregoing summary and the following detailed description are exemplary, and are intended to provide further explanation of the invention as claimed.

BRIEF DESCRIPTION OF THE DRAWINGS/FIGURES

The present invention is described with reference to the accompanying drawings, wherein generally like reference numbers indicate identical or functionally similar elements. Also generally, the leftmost digit(s) of the reference numbers identify the drawings in which the associated elements are first introduced.

DETAILED DESCRIPTION OF THE INVENTION

I. Introduction

The present invention is directed to methods and systems for extending the coverage area of broadband wireless communications, such as internet access through cellular telephone systems.

Figure 1:
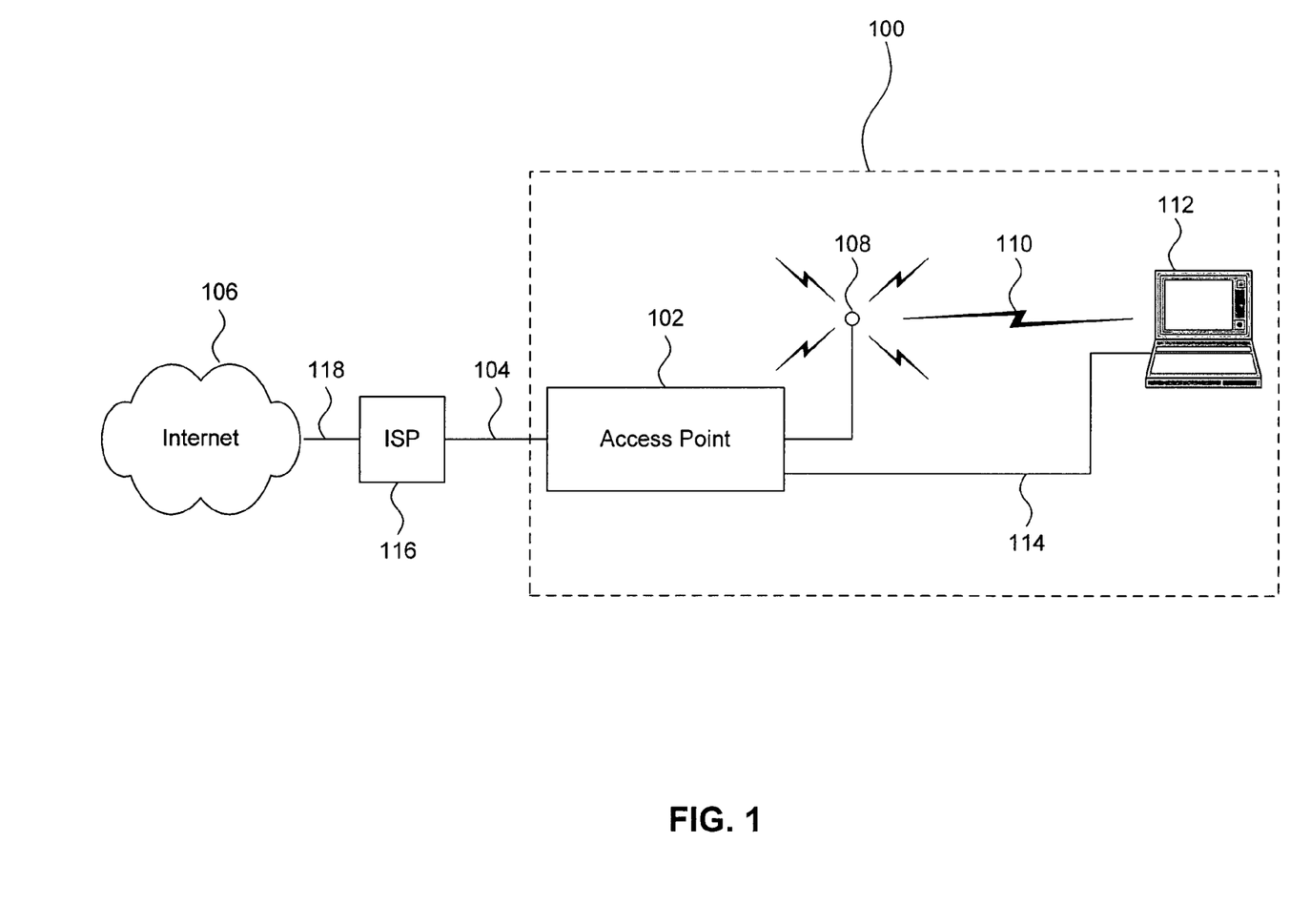
FIG. 1 is an exemplary illustration of a wireless LAN communication environment.

FIG. 1 is a block diagram of an example local area network ("LAN") system 100. The LAN system 100 includes an access point ("AP") 102, such as a wired and/or wireless router. The AP 102 is connected via physical connection 104 to an internet service provider ("ISP") 116. The physical connection 104 can be, for example, a hardwired broadband connection or a wireless broadband connection. The internet service provider ("ISP") 116 is connected to the internet 106 through a connection 118.

The AP 102 interfaces between the ISP 116 and one or more devices 112. The AP 102 optionally includes a wireless router and an antenna 108. In this embodiment, the AP 102 transmits and receives an electromagnetic wave 110 to communicate data with one or more of the devices 112, such as computers or other data processing devices with wireless LAN capability. Alternatively, or additionally, the AP 102 includes a physical connection 114 to one or more of the devices 112.

Cellular telephone companies are attempting to design broadband wireless systems that will communicate wirelessly between the ISP 116 and devices 112, thus eliminating the need for physical connection 104 and/or AP 102.

Figure 2:
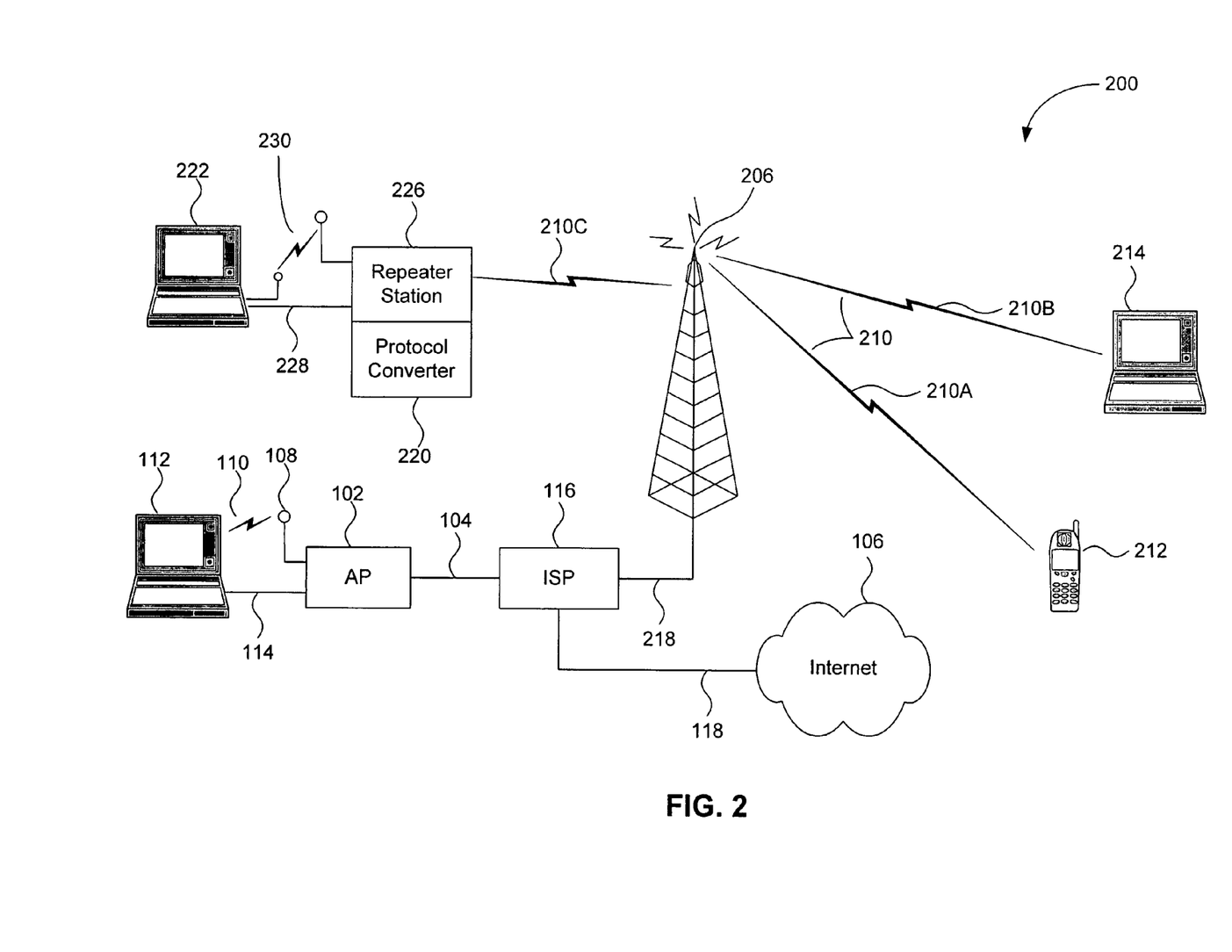
FIG. 2 is an exemplary illustration of broadband wireless communication environment.

FIG. 2 is an illustration of a broadband wireless system 200. The broadband wireless system 200 includes the ISP 116 and System 100 as described above with reference to FIG. 1.

In the example of FIG. 2, the ISP 116 is coupled to a transceiver apparatus or tower 206, such as a conventional cellular telephone transceiver tower. The cellular telephone transceiver tower 206 provides a broadband wireless communication link 210 in addition to wireless voice services and to a variety of wireless devices.

For example, the transceiver tower 206 interfaces with a wireless device 214 (e.g., a laptop computer) via broadband wireless communications channel 210B. The transceiver tower 206 provides broadband wireless service (e.g., internet access) to the wireless device 214.

The wireless communication channel 2101B has, for example, a cellular telephone protocol. Thus, the wireless device 214 need to contain, or be modified to include a communication device, such as a PCMCIA card or internal circuit card, plus associated software, to communicate with the transceiver tower 206 via wireless communication channel 210B. To be commercially effective, many wireless devices 214 will need to be equipped with additional hardware and/or software to be compatible with the cell phone network There are locations where the wireless device 214 does not effectively communicate with transceiver tower 206. For example, the electromagnetic wave of broadband wireless communications link 210 may not for whatever reason (obstructions, multi-path, increased bandwidth, etc.) reach all desired coverage areas. As a result, in some environments and locations, wireless communications is poor or non-existent due to poor propagation.

In the example of FIG. 2, the transceiver tower 206 also communicates with a cellular telephone 212 via communication channel 210A. The communication channel 210A includes conventional cellular telephone service. Alternatively, or additionally, the communication channel 210A includes broadband wireless service (e.g., internet access). The communication channel 210A potentially suffers from the same drawbacks that affect communication channel 210B.

II. Repeater Station

In accordance with an aspect of the invention, the wireless system 200 includes a repeater station 226. The repeater station 226 is positioned to effectively communicate with the transceiver tower 206 through a wireless communication channel 210C. The repeater station 226 interfaces between the transceiver tower 206 and one or more devices 222.

The repeater station 226 communicates with the one or more devices 222, or a portion thereof, via wireless communication link 230. Alternatively, or additionally, the repeater station 226 communicates with the one or more devices 222, or a portion thereof, via a physical link 228, which can be a wire, optic fiber, infra-red, and/or any other type of physical link.

Figure 3:
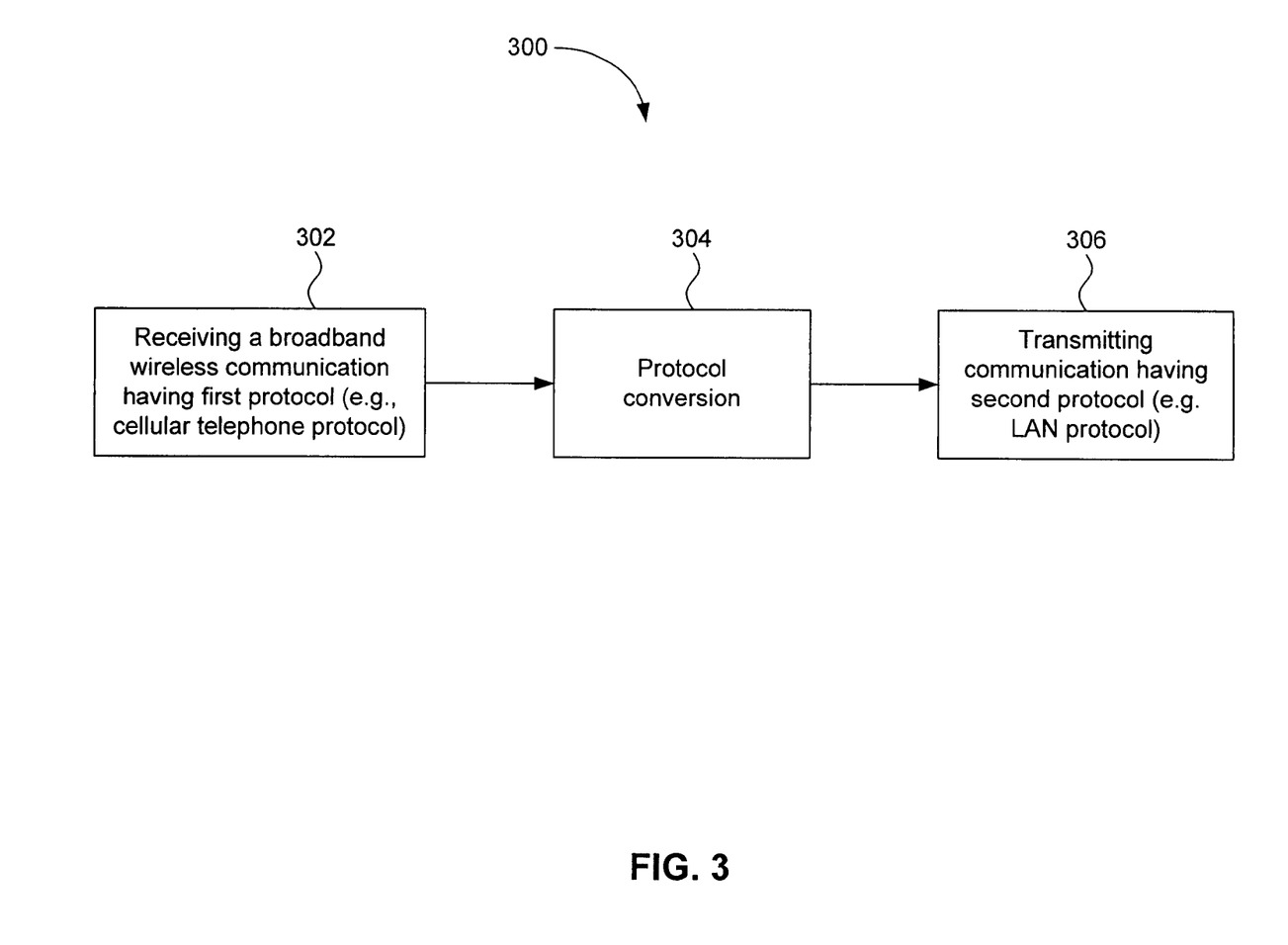
FIG. 3 is a process flowchart for converting from a broadband wireless protocol to a wireless LAN protocol.

As described below with respect to FIGS. 3 and 4, the repeater station 226 is implemented to receive information from the transceiver tower 206, and/or to transmit the information to the one or more devices 222.

Based on the description herein, one skilled in the relevant art(s) will understand that the repeater station 226 can be implemented in a variety of ways.

III. Protocol Conversion

In accordance with an embodiment of the invention, the repeater station 226 includes a protocol converter 220 that converts between a first protocol associated with the broadband wireless communication 210C, and one or more additional protocols associated with the one or more devices 222, or a portion thereof.

For example, and without limitation, the first protocol of the communication channel 210C includes a cellular telephone protocol and at least one of the devices 222 operate with a second protocol, such as a LAN protocol. In this embodiment, the protocol converter 220 converts between the cellular telephone protocol and the LAN protocol. Example LAN protocols are described below.

The protocol converter 220 permits the one or more devices 222 to utilize conventional LAN hardware, software, and/or firmware. Thus, where a device 222 includes pre-existing LAN capabilities, no special upgrades are required to the device 222. The invention is not limited, however, to existing LAN hardware, software, and/or firmware. Based on the description herein, one skilled in the relevant art(s) will understand that the protocol converter can be implemented to interface with conventional and/or future developed protocols.

As noted above, aspects of the invention can be implemented for unidirectional or bi-directional operation. FIG. 3 is an example process flowchart 300 for converting from a first protocol to a second protocol, in accordance with an embodiment of the invention. Flowchart 300 is described below with reference to FIG. 2. The invention is not, however, limited to the example of FIG. 2. Based on the description herein, one skilled in the relevant art(s) will understand that the invention can be implemented with other systems.

The flowchart 300 is now described for converting from a protocol associated with broadband wireless communication channel 210C, to a second protocol, such as a LAN protocol, associated with the one or more devices 222.

The process begins at step 302, which includes receiving a broadband wireless communication having a first protocol. In the example of FIG. 2, the repeater station 226 receives information over communication channel 210C from the transceiver tower 206. The information on communication channel 210C is formatted according to, for example, a cellular telephone protocol.

Step 304 includes converting the received broadband wireless communication from the first protocol to a second protocol. In FIG. 2, the protocol converter 220 converts information in communication channel 210C from the cellular telephone protocol to a LAN protocol. The LAN protocol can be, for example, a protocol in accordance with IEEE Standard 802.11 et sequens. IEEE Standard 802.11 is available, for example, at: <http://grouper.ieee.org/groups/802/11/>.

Step 306 includes transmitting the protocol-converted communication to a device via wireless or wired means. In FIG. 2, the repeater station 226 transmits protocol-converted communication 230 to the device 222.

Alternatively, or additionally, steps 302, 304, and 306 are implemented to communicate from one or more of the devices 222 to the tower 206.

Figure 4:
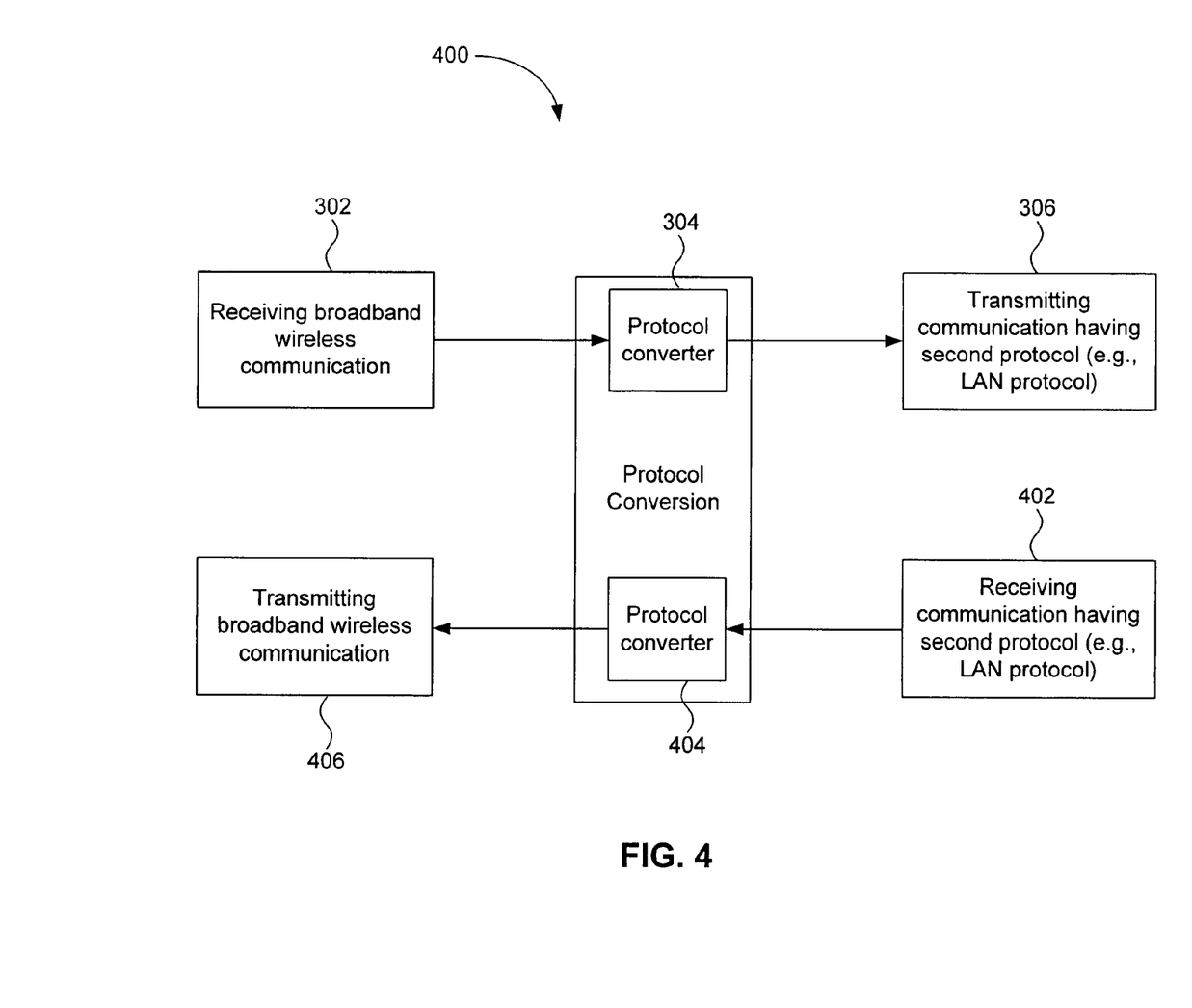
FIG. 4 is a process flowchart for bi-directionally converting between a broadband wireless protocol and a wireless LAN protocol.

FIG. 4 is an example process flowchart 400 for bi-directional protocol conversion, in accordance with the aspects of the invention. Flowchart 400 is described below with reference to FIG. 2. The invention is not, however, limited to the example of FIG. 2. Based on the description herein, one skilled in the relevant art(s) will understand that the invention can be implemented with other systems.

The process flowchart 400 begins with steps 302, 304, and 306, substantially as described above with respect to FIG. 3.

The process flowchart 400 further includes step 402, which includes receiving a broadband communication formatted according to the second protocol, from a device. In the example of FIG. 2, the repeater station 226 receives communication 230 from the device 222. Alternatively, or additionally, the repeater station 226 receives a communication via physical link 228. The received communication is formatted according to a protocol associated with the device 222 (i.e., the second protocol, e.g., a LAN protocol).

Step 404 includes converting the received communication from the second protocol to the first protocol. In the example of FIG. 2, the protocol converter 226 converts communication 230 from the LAN protocol to the cellular telephone protocol.

Step 406 includes transmitting the protocol-converted communication. In FIG. 2, the repeater station 226 transmits protocol-converted information in communication channel 210C to the transceiver tower 206.

Steps 302, 304, and 306 are optionally independent of steps 402, 404, and 406. Alternatively, steps 302, 304, and 306 are optionally dependent of steps 402, 404, and 406, and/or vice versa. For example, steps 302, 304, and 306 are optionally performed in response to steps 402, 404, and 406. Alternatively, or additionally, steps 402, 404, and 406 are optionally performed in response to steps 302, 304, and 306.

IV. Example Implementations

Aspects of the invention can be implemented in a variety of applications.

A. Broadband Wireless Services

The broadband wireless communication channel 210C (FIG. 2) can include one or more of a variety of types of wireless communication. For example, and without limitation, the wireless communication channel 210C can carry a cellular communication, such as a cellular telephone communication, and/or cellular wireless internet service. Alternatively, or additionally, the wireless communication channel 210C can carry one or more of a wide area network ("WAN") communication, such as a wireless communication from an IEEE 802.16 tower or device, and/or a broadband satellite communication.

The invention is not, however, limited to the examples herein. Based on the description herein, one skilled in the relevant art(s) will understand that the broadband wireless communication channel 210C can carry one or more of a variety of other types of broadband wireless communications.

Similarly, the broadband wireless communication link 230, and/or a communication on physical link 228, optionally includes one or more of a variety of types of broadband communications, including, without limitation, LAN communication. As described above, the LAN protocol can be, for example, a protocol in accordance with IEEE Standard 802.11. Additional optional protocols are described below.

The invention is not, however, limited to the examples herein. Based on the description herein, one skilled in the relevant art(s) will understand that the broadband wireless communication 230 and/or a communication on physical link 228, can include one or more of a variety of other types of broadband wireless communication.

B. Physical Locations

1. Locations for the Repeater Station and Protocol Converter

The repeater station 226 (FIG. 2) is positioned at a location that receives adequate signal strength with respect to broadband wireless communication channel 210C. The optional protocol converter 220 is incorporated within or coupled to the repeater station 226. The coupling can be physical and/or wireless.

The repeater station 226 and/or the protocol converter 220 are optionally positioned in a fixed location. For example, and without limitation, the repeater station 226 and the protocol converter 220 are positioned on or within a building, train station, subway, oil rig, church, prison, lamp post, bus shelter, school, office building, house, monument, telephone pole, tower, hotel, crane, warehouse, hanger, terminal, drydock, dam, jetway, bridge, dock, lock, marina, emergency services facility, police station, fire station, central office, equipment shelter, observation tower, power plant, factory, silo, research facility, shopping center, shopping mall, cellular communication system tower, traffic signal, fire escape, scaffold, bridge, convention center, sports arena, stadium, stage, and/or other man-made structure.

The repeater station 226 and/or the protocol converter 220 are optionally positioned on a fixed installation on a naturally-occurring structure or terrain feature. The protocol converter 220 is optionally designed to be wall-mountable, rack-mountable, and/or surface-mountable.

Alternatively or additionally, the repeater station 226 and/or the protocol converter 220 are optionally positioned on a mobile platform. In this way, the one or more devices 222 are can be moved around within a range of the mobile platform. For example, and without limitation, the repeater station 226 and/or the protocol converter 220 are positioned on or within a bus, taxi, car, truck, tractor, van, multi-purpose vehicle, sport utility vehicle, police vehicle, fire truck, ambulance, train car, locomotive, airplane, helicopter, blimp, hovercraft, boat, ship, barge, tugboat, construction machinery, naval vessel, motorcycle, subway car, pullman, trolley, lawnmower, race car, all-terrain vehicle, golf cart, forklift, segway, scooter, bicycle, pedal car, rickshaw, sled, tractor-trailer, delivery truck, trailer, submarine, raft, pushcart, and/or other transportation apparatus.

2. Locations for the Devices

The one or more devices 222 are positioned in a location that receives adequate signal strength with respect to broadband wireless communication 224 and/or a communication on physical link 228. The one or more devices 222 are mobile within a range of the repeater station 226.

C. Device Types

The one or more devices 222 can include a variety of types of devices, such as, without limitation, a desk-top computer, lap-top computer, printer, security system, thermostat, household appliance, industrial appliance, watercraft, airplane, industrial machinery, and/or electronic control system, such as an electronic control system for an automobile. The invention is not limited to these examples, but includes any data processing device or communication.

D. Controls, Settings, and Indicators

The repeater station 226 and/or the protocol converter 220 optionally include one or more controllable settings. The settings can include settings that are wholly controlled by a manufacturer and/or settings that are user selectable.

The settings can include, for example, protocol selection settings that allow a manufacturer and/or user to select one or more protocols that are compatible with the protocol of the broadband wireless transmission 210C. The protocol converter 220 is also optionally factory set to communicate using a protocol that is compatible with the desired wireless LAN protocol. Alternatively, or additionally, the protocol of the broadband wireless transmission 210 is user-selectable. Alternatively, or additionally, the wireless LAN protocol is user-selectable. Alternatively, or additionally, the protocol converter 220 automatically senses and selects the broadband wireless protocol and/or the wireless LAN protocol.

Device addresses, subscriber numbers, phone numbers, and other device identifiers set in hardware and/or software of the protocol converter 220 are factory pre-set, user-selectable, and/or automatically sensed and set.

Software settings are optionally effected remotely by physical and/or wireless connection. Alternatively, or additionally, software settings are optionally effected locally.

Other optional controllable features include varying the output power of the repeater station 226 to maintain an optimal signal between the protocol converter 220 and devices 220 and/or transceiver tower 206. Power adjustment is effected manually and/or automatically.

The protocol converter 220 optionally provides multiple broadband wireless communications channel 210C to provide, for example, diverse and/or redundant service.

The protocol converter 220 optionally provides multiple wireless LAN connections 230.

The protocol converter 220 optionally includes one or more antennas to communicate with the one or more devices 220 and/or the transceiver tower 206. In an embodiment, the protocol converter 220 includes a single antenna to communicate with the one or more devices 220 and the transceiver tower 206. Alternatively, or additionally, the protocol converter 220 includes at least one antenna to communicate with the one or more devices 220, and at least one other antenna to communicate with the transceiver tower 206.

The protocol converter 220 optionally includes at least one of: an integral antenna; an external antenna; a removable antenna; and a fixed antenna; to communicate with the one or more devices 220 and/or the transceiver tower 206.

The repeater station 226 and/or the protocol converter 220 optionally include a data router, which includes one or more receptacles or ports for a wired LAN.

The repeater station 226 and/or the protocol converter 220 optionally include one or more of a DSL modem, cable modem, ISDN modem, and/or dial-up modem.

The repeater station 226 and/or the protocol converter 220 optionally include one or more password protection features.

The repeater station 226, the protocol converter 220, and or the device 222 optionally include a hardwired or cordless telephone system.

The repeater station 226, the protocol converter 220, and or the device 222 optionally include one or more audio inputs for voice activated connections. The repeater station 226, the protocol converter 220, and or the device 222 optionally include one or more audio outputs for providing information or requests to a user.

The repeater station 226 and/or the protocol converter 220 are optionally powered by one or more of a variety of power sources including AC, DC, and/or battery power sources.

The repeater station 226, the protocol converter 220, and or the device 222 optionally include one or more of a variety of visual and/or audible indicators, such as status indicators. Status indicators can include, without limitation, link, data rate, RF transmit power, RF signal strength, supply power, and/or protocol type.

The repeater station 226, optionally includes Voice over Internet Protocol (VoIP) capability. A VoIP enabled device would be able to communicate with cell tower 206 (FIG. 2), thereby enabling bi-directional VoIP to cell phone voice communications.

The repeater station 226, optionally includes Quality of Service (QoS) capability. The QoS protocol could give higher priority to voice information, thereby enabling seamless voice and data communications on a network.

D. Example Environments

The repeater station 226 and/or the protocol converter 220 can be implemented in one or more of a variety of environments. For example, and without limitation, repeater station 226 and/or the protocol converter 220 can be implemented as part of a system associated with one or more of the following, alone and/or in combination with one another:

local area networks;
remote monitoring;
security systems, including home security systems and/or industrial security systems;
remote data logging;
monitoring of utility meters, such as oil or gas meters, residential and/or commercial;
Supervisory Control and Data Acquisition (SCADA);
Monitoring and/or control of environmental conditions;
remote telemetry;
factory automation;
point-of-sale monitoring;
wireless inventory control;
mobile sales;
field service;
meter reading;
warehousing applications;
portable data terminals;
audio/visual transmissions;
radio transmissions;
television transmissions;
home automation;
security monitoring;
medical monitoring;
home and/or industrial heating and/or air-conditioning controls; and/or
packet data radio.

Network Standards

The wireless communications 230, 210A, 210B, 210C, and/or 110; and/or communications over physical link 228 and/or 114; are optionally implemented in accordance with, and/or are in conformance with, one or more of the following standards:

IEEE 802.11a, IEEE 802.11b, IEEE 802.11g, IEEE 802.16, IEEE 802.16a, IEEE 802.16e, IEEE 802.20, IEEE 802.15, T1, T3, DS1, DS3, ethernet, HiperMAN, HiperAccess, WirelessMAN, HiperLAN, HiperLAN2, HiperLink, internet protocol, transmission control protocol, atm, ppp, ipx, appletalk, windows nt, systems network architecture, decnet, netware, ipx, spx, netbios, Ethernet, FDDI, PPP, Token-Ring, IEEE 802.11, Classical IP over ATM, 3GPP2 A11, 802.11 MGT, 802.11 Radiotap, AAL1, AAL3_4, AARP, ACAP, ACSE, AFP, AFS (RX), AH, AIM, AIM Administration, AIM Advertisements, AIM BOS, AIM Buddylist, AIM Chat, AIM ChatNav, AIM Directory, AIM Generic, AIM ICQ, AIM Invitation, AIM Location, AIM Messaging, AIM OFT, AIM Popup, AIM SSI, AIM Signon, AIM Stats, AIM Translate, AIM User Lookup, AJP13, ALCAP, ANS, ANSI BSMAP, ANSI DTAP, ANSI IS-637-A Teleservice, ANSI IS-637-A Transport, ANSI IS-683-A (OTA (Mobile)), ANSI IS-801 (Location Services (PLD)), ANSI MAP, AODV, ARCNET, ARP/RARP, ASAP, ASF, ASP, ATM, ATM LANE, ATP, ATSVC, AVS WLANCAP, Auto-RP, BACapp, BACnet, BEEP, BER, BFD Control, BGP, BICC, BOFL, BOOTP/ DHCP, BOOTPARAMS, BOSSVR, BROWSER, BSSAP, BSSGP, BUDB, BUTC, BVLC, Boardwalk, CAST, CCSDS, CDP, CDS_CLERK, CFLOW, CGMP, CHDLC, CLDAP, CLEARCASE, CLNP, CLTP, CONV, COPS, COTP, CPFI, CPHA, CUPS, CoSine, DCCP, DCERPC, DCE_DFS, DDP, DDTP, DEC_STP, DFS, DHCPv6, DISTCC, DLSw, DNS, DNSSERVER, DRSUAPI, DSI, DTSPROVIDER, DTSS-TIME_REQ, DVMRP, Data, Diameter, E.164, EAP, EAPOL, ECHO, EDONKEY, EFSRPC, EIGRP, ENC, ENIP, EPM, EPM4, ESIS, ESP, ETHERIP, Ethernet, FC, FC ELS, FC FZS, FC-FCS, FC-SB3, FC-SP, FC-SWILS, FC-dNS, FCIP, FCP, FC_CT, FDDI, FIX, FLDB, FR, FTAM, FTP, FTP-DATA, FTSERVER, FW-1, Frame, GIF image, GIOP, GMRP, GNUTELLA, GPRS NS, GPRS-LLC, GRE, GSM BSSMAP, GSM DTAP, GSM MAP, GSM RP, GSM SMS, GSM SMS UD, GSS-API, GTP, GVRP, H.261, H.263, H1, H225, H245, H4501, HCLNFSD, HPEXT, HSRP, HTTP, HyperSCSI, IAPP, IB, ICAP, ICL_RPC, ICMP, ICMPv6, ICP, ICQ, IGAP, IGMP, IGRP, ILMI, IMAP, INITSHUT-DOWN, IP, IP/IEEE1394, IPComp, IPDC, IPFC, IPMI, IPP, IPVS, IPX, IPX MSG, IPX RIP, IPX SAP, IPX WAN, IPv6, IRC, ISAKMP, ISDN, ISIS, ISL, ISMP, ISUP, IUA, Inter-Asterisk eXchange v2, JFIF (JPEG) image, Jabber, KADM5, KLM, KRB5, KRB5RPC, Kpasswd, L2TP, LACP, LAN-MAN, LAPB, LAPBETHER, LAPD, LDAP, LDP, LLAP, LLC, LMI, LMP, LPD, LSA, LSA_DS, LWAPP, LWAPP-CNTL, LWAPP-L3, Laplink, Line-based text data, Lucent/ Ascend, M2PA, M2TP, M2UA, M3UA, MAPI, MDS Header, MGMT, MIME multipart, MIPv6, MMSE, MOUNT, MPEG1, MPLS, MPLS Echo, MQ, MQ PCF, MRDISC, MS Proxy, MSDP, MSNIP, MSNMS, MTP2, MTP3, MTP3MG, Media, Messenger, Mobile IP, Modbus/TCP, MySQL, NBDS, NBIPX, NBNS, NBP, NBSS, NCP, NDMP, NDPS, NETLOGON, NFS, NFSACL, NFSAUTH, NIS+, NIS+CB, NLM, NLSP, NMAS, NMPI, NNTP, NSPI, NTLMSSP, NTP, NW_SERIAL, NetBIOS, Null, OAM AAL, OLSR, OSPF, OXID, PCNFSD, PER, PFLOG, PFLOG-OLD, PGM, PIM, POP, POSTGRESQL, PPP, PPP BACP, PPP BAP, PPP CBCP, PPP CCP, PPP CDPCP, PPP CHAP, PPP Comp, PPP IPCP, PPP IPV6CP, PPP LCP, PPP MP, PPP MPLSCP, PPP OSICP, PPP PAP, PPP PPPMux, PPP PPPMuxCP, PPP VJ, PPPoED, PPPoES, PPTP, PRES, PTP, Portmap, Prism, Q.2931, Q.931, Q.933, QLLC, QUAKE, QUAKE2, QUAKE3, QUAKE-WORLD, RADIUS, RANAP, REMACT, REP_PROC, RIP, RIPng, RMCP, RMI, RMP, RPC, RPC_BROWSER, RPC_NETLOGON, RPL, RQUOTA, RSH, RSTAT, RSVP, RSYNC, RS_ACCT, RS_ATTR, RS_BIND, RS_PGO, RS_PLCY, RS_REPADM, RS_REPLIST, RS_UNIX, RTCP, RTMP, RTP, RTP Event, RTPS, RTSP, RWALL, RX, Raw, Raw_SIP, Rlogin, SADMIND, SAMR, SAP, SCCP, SCCPMG, SCSI, SCTP, SDLC, SDP, SEBEK, SECIDMAP, SES, SGI MOUNT, SIP, SIPFRAG, SKINNY, SLARP, SLL, SMB, SMB Mailslot, SMB Pipe, SMPP, SMTP, SMUX, SNA, SNA XID, SNAETH, SNDCP, SNMP, SONMP, SPNEGO-KRB5, SPOOLSS, SPRAY, SPX, SRVLOC, SRVSVC, SSCOP, SSH, SSL, STAT, STAT-CB, STP, STUN, SUA, SVCCTL, Serialization, SliMP3, Socks, SoulSeek, Spnego, Symantec, Syslog, T38, TACACS, TACACS+, TAPI, TCAP, TCP, TDS, TEI_MANAGEMENT, TELNET, TEREDO, TFTP, TIME, TKN4Int, TNS, TPCP, TPKT, TR MAC, TRKSVR, TSP, TUXEDO, TZSP, Token-Ring, UBIKDISK, UBIKVOTE, UCP, UDP, UDPENCAP, V.120, VLAN, VRRP, VTP, Vines ARP, Vines Echo, Vines FRP, Vines ICP, Vines IP, Vines IPC, Vines LLC, Vines RTP, Vines SPP, WAP SIR, WBXML, WCCP, WCP, WHDLC, WHO, WINREG, WKSSVC, WSP, WTLS, WTP, X.25, X.29, X11, XDMCP, XOT, XYPLEX, YHOO, YMSG, YPBIND, YPPASSWD, YPSERV, YPXFR, ZEBRA, ZIP, cds_solicit, cprpc_server, dce_update, dicom, iSCSI, iSNS, llb, message/ http, rdaclif, roverride, rpriv, rs_attr_schema, rs_misc, rs_prop_acct, rs_prop_acl, rs_prop_attr, rs_prop_pgo, rs_prop_plcy, rs_pwd_mgmt, rs_repmgr, rsec_login, and/or sFlow.

The communication channels 210A, 210B, and/or 210C optionally include, and/or are generated according to, and/or are in conformance with, without limitation, one or more of: quadrature amplitude modulation, orthogonal frequency division multiplexing, vector orthogonal frequency division multiplexing, wideband orthogonal frequency division multiplexing, frequency division duplex, time division duplex, gaussian minimum shift keying, binary phase shift keying, differential phase shift keying, quadrature phase shift keying, binary frequency shift keying, minimum shift keying, phase shift keying, frequency shift keying, direct sequence spread spectrum, pulse code modulation, pulse amplitude modulation, amplitude modulation, frequency modulation, angle modulation, quadrature multiplexing, single sideband amplitude modulation, vestigial sideband amplitude modulation, analog modulation, digital modulation, phase modulation, and/or frequency hopped spread spectrum.

The invention is optionally implemented with one or more of: gsm, cdma, gprs, umts, cdma2000, tdma, cellular, iden, pdc, is-95, is-136, is-54, is-661, amps, dcs 1800, edge, pcs 1900, gsm 900, gsm 850, namps, sdma, uwc-136, wpcdma, wap, a wide area network protocol, a satellite radio protocol, and/or wcdma.

The invention may include any combination of the foregoing, although the invention is not, however, limited to the examples herein.

CONCLUSION

From the foregoing disclosure and detailed description, it will be apparent that various modifications, additions, and other alternative embodiments are possible without departing from the scope and spirit of the invention. Such modifications and variations are within the scope of the present invention as determined by the appended claims when interpreted in accordance with the benefit to which they are fairly, legally, and equitably entitled.

The present invention has been described above with the aid of functional building blocks illustrating the performance of specified functions and relationships thereof. The boundaries of these functional building blocks have been defined herein for the convenience of the description. Alternate boundaries can be defined so long as the specified functions and relationships thereof are appropriately performed. Such alternate boundaries are within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Ownership and/or possession of equipment by an entity is presented herein by way of example only, and not limitation. Thus, the breadth and scope of the present invention should not be limited by any of the above-described exemplary embodiments, but should be defined only in accordance with the following claims and their equivalents.

I claim:

1. A method for communicating comprising:
   (a) receiving broadband wireless data formatted according to a cellular telephone protocol at a repeater;
   (b) sensing said cellular telephone protocol;
   (c) dynamically selecting one or more local area network (LAN) protocols, said one or more LAN protocols compatible with one or more wireless devices within range of said repeater;
   (d) converting said broadband wireless data from said cellular telephone protocol to said selected one or more LAN protocols; and
   (e) transmitting said converted data.

2. The method according to claim 1, further comprising:
   (f) receiving data formatted according to said one or more LAN protocols;
   (g) converting said data formatted according to said one or more LAN protocols to said cellular telephone protocol; and
   (h) transmitting said data converted to said cellular telephone protocol as broadband wireless data.

3. The method according to claim 2, wherein at least one of said one or more LAN protocols complies with IEEE standard 802.11.

4. The method according to claim 2, wherein said method is performed at a substantially fixed position.

5. The method of claim 4, wherein said method is performed at one or more of a building, train station, subway, oil rig, church, prison, lamp post, bus shelter, school, office building, house, monument, telephone pole, tower, hotel, crane, warehouse, hanger, terminal, drydock, dam, jetway, bridge, dock, lock, marina, emergency services facility, police station, fire station, central office, equipment shelter, observation tower, power plant, factory, silo, research facility, shopping center, shopping mall, cellular communication system tower, traffic signal, fire escape, scaffold, bridge, convention center, sports arena, stadium, and stage.

6. The method according to claim 2, wherein said method is performed within a mobile platform.

7. The method of claim 6, wherein said method is performed within one or more of a bus, taxi, car, truck, tractor, van, multi-purpose vehicle, sport utility vehicle, police vehicle, fire truck, ambulance, train car, locomotive, airplane, helicopter, blimp, hovercraft, boat, ship, barge, tugboat, construction machinery, naval vessel, motorcycle, subway car, pullman, trolley, lawnmower, race car, all-terrain vehicle, golf cart, forklift, segway, scooter, bicycle, pedal car, rickshaw, sled, tractor-trailer, delivery truck, trailer, submarine, raft, and pushcart.

8. The method of claim 2, wherein steps (e) and (f) respectively comprise wirelessly transmitting and receiving said data.

9. The method of claim 8, wherein steps (e) and (f) respectively comprise wirelessly transmitting and receiving said data to and from a portable device.

10. The method of claim 9, wherein steps (e) and (f) respectively comprise wirelessly transmitting and receiving said data to and from a transportable computer.

11. The method of claim 8, wherein steps (e) and (f) respectively comprise wirelessly transmitting and receiving said data to and from a fixed-location device.

12. The method of claim 11, wherein steps (e) and (f) respectively comprise at least one of wirelessly transmitting and receiving said data to and from a home security system.

13. A method for communicating comprising:
    receiving wireless data formatted according to a LAN (local area network) protocol at a repeater;
    sensing said LAN protocol;
    dynamically selecting one or more cellular telephone protocols, said one or more cellular telephone protocols compatible with one or more wireless devices within range of said repeater;
    converting said wireless data formatted according to said LAN protocol to said selected one or more cellular telephone protocols; and
    transmitting said converted data as broadband wireless data.

14. A converter for interfacing between a cellular telephone system and local area network (LAN) system, comprising:
    a first wireless transceiver configured to interface with a cellular telephone system;
    a second wireless transceiver configured to interface with a LAN device; and
    a first converter coupled between said first and second wireless transceivers, said first converter configured to convert data between a cellular telephone protocol and a LAN protocol,
    wherein said first converter includes one or more controllable settings, said controllable settings used to specify one or more of a plurality of cellular telephone protocols for said cellular telephone protocol and one or more of a plurality of LAN protocols for said LAN protocol.

15. A method for communicating, comprising:
    receiving broadband wireless data formatted according to a wide area network (WAN) protocol at a repeater;
    sensing said WAN protocol;
    dynamically selecting a local area network (LAN) protocol, said LAN protocol compatible with a wireless device within range of said repeater;
    converting said broadband wireless data from said WAN protocol to said LAN protocol; and
    transmitting said data converted to said LAN protocol.

16. A method for communicating, comprising:
    receiving wireless data formatted according to a local area network (LAN) protocol at a repeater;
    sensing said LAN protocol;
    dynamically selecting a wide area network (WAN) protocol, said WAN protocol compatible with a wireless device within range of said repeater;
    converting said wireless data formatted according to said LAN protocol to said WAN protocol; and
    transmitting said converted data formatted according to said WAN protocol as broadband wireless data.

17. The method according to claim 15, further comprising:
    receiving data formatted according to said LAN protocol;
    converting said data formatted according to said LAN protocol to said wide area network protocol; and
    transmitting said data converted to said wide area network protocol as broadband wireless data.

18. The method according to claim 15, wherein said LAN protocol complies with IEEE standard 802.11.

19. The method according to claim 15, wherein said wide area network protocol complies with at least one of a IEEE standard 802.16 or a satellite communication protocol.

20. The method of claim 1, further comprising:
    (f) varying an output power of said repeater to maintain an appropriate signal level between said repeater and said one or more wireless/devices.

21. The method of claim 20, wherein varying said output power comprises varying said output power manually.

22. The method of claim 20, wherein varying said output power comprises varying said output power automatically.

23. The method of claim 13, further comprising:
    (f) varying an output power of said repeater to maintain an appropriate signal level between said repeater and said one or more wireless devices.

24. The method of claim 23, wherein varying said output power comprises varying said output power manually.

25. The method of claim 23, wherein varying said output power comprises varying said output power automatically.

* * * * *